(12) United States Patent
Hamalainen (10) Patent No.: US 11,085,286 B2
(45) Date of Patent: Aug. 10, 2021

(54) ROCK BREAKING DEVICE

(71) Applicant: SANDVIK MINING AND CONSTRUCTION OY, Tampere (FI)

(72) Inventor: Pasi Hamalainen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 200 days.

(21) Appl. No.: 16/544,863

(22) Filed: Aug. 19, 2019

(65) Prior Publication Data
US 2020/0080411 A1    Mar. 12, 2020

(30) Foreign Application Priority Data

Aug. 31, 2018  (EP) ..................................... 18192024

(51) Int. Cl.
| | |
|---|---|
| *E21B 1/00* | (2006.01) |
| *G01L 1/10* | (2006.01) |
| *G01L 1/25* | (2006.01) |
| *G01N 29/11* | (2006.01) |
| *E21B 44/08* | (2006.01) |

(52) U.S. Cl.
CPC ............... *E21B 44/08* (2013.01); *E21B 1/00* (2013.01); *G01L 1/10* (2013.01); *G01L 1/255* (2013.01); *G01N 29/11* (2013.01); *G01N 2291/02827* (2013.01); *G01N 2291/044* (2013.01); *G01N 2291/2691* (2013.01)

(58) Field of Classification Search
CPC ........... G01L 1/10; G01L 1/255; G01N 29/11; G01N 2291/044; G01N 2291/2691; G01N 2291/02827; E21B 47/00; E21B 44/08; E21B 44/00; E21B 1/00

USPC .......................................................... 73/598
See application file for complete search history.

(56) References Cited

U.S. PATENT DOCUMENTS

| | | | |
|---|---|---|---|
| 4,671,366 A | 6/1987 | Uitto et al. | |
| 4,759,412 A * | 7/1988 | Brazell, II | ........... B25D 11/005 173/114 |
| 7,895,900 B2 * | 3/2011 | Keskiniva | ............... E21B 44/02 73/781 |
| 10,087,755 B2 * | 10/2018 | Beaton | .................... E21C 37/02 |
| 2009/0188686 A1 * | 7/2009 | Keskiniva | ................ B25D 9/26 173/1 |

(Continued)

FOREIGN PATENT DOCUMENTS

| | | |
|---|---|---|
| CL | 201902354 | 8/2019 |
| EP | 0409304 A1 | 1/1991 |
| EP | 2416149 A1 | 2/2012 |

(Continued)

*Primary Examiner* — Jacques M Saint Surin
(74) *Attorney, Agent, or Firm* — Corinne R. Gorski (57) ABSTRACT

A rock breaking device and a method of monitoring a condition of a tool of a rock breaking device is provided. The rock breaking device includes a frame, a tool, a device for generating stress waves in the tool, measuring means for measuring the stress wave propagating in the tool and at least one computing unit for monitoring a condition of the tool on the basis of the measured stress wave. The at least one computing unit is configured to determine a condition of the tool on the basis of a time of propagation of at least one reflected stress wave component of the stress wave and at least one additional property of the same reflected stress wave component.

10 Claims, 5 Drawing Sheets

(56) References Cited

U.S. PATENT DOCUMENTS

| | | | |
|---|---|---|---|
| 2013/0115020 A1* | 5/2013 | Schwarz | B23B 51/02 408/230 |
| 2014/0026673 A1* | 1/2014 | Lemaster | G01N 3/58 73/800 |

FOREIGN PATENT DOCUMENTS

| | | |
|---|---|---|
| WO | 03/033216 A1 | 4/2003 |
| WO | 2007082997 A1 | 7/2007 |
| WO | 2010037905 A1 | 4/2010 |

* cited by examiner

ROCK BREAKING DEVICE

RELATED APPLICATION DATA

This application claims priority under 35 U.S.C. § 119 to EP Patent Application No. 18192024.0, filed on Aug. 31, 2018, which the entirety thereof is incorporated herein by reference.

FIELD OF THE INVENTION

The invention relates to a rock breaking device and a method of monitoring a condition of a tool of a rock breaking device.

BACKGROUND

Rock breaking may be performed by drilling holes in a rock by a percussion rock drilling machine. Alternatively, rock may be broken by a breaking hammer. In this context, the term "rock" is to be understood broadly to also cover a boulder, rock material, crust and other relatively hard material.

The rock drilling machine and breaking hammer include a percussion device, which gives impact pulses to the tool either directly or through a shank, and thereby generates stress waves travelling in the tool. The impact of the percussion device to the tool or the shank provides a compression stress wave in the tool, where the wave propagates to the outermost end of the tool. When the compression stress wave reaches the tool's outermost end, the tool penetrates into the rock due to the influence of the wave. Some of the energy of the compression stress wave generated by the percussion device is reflected back as a reflected wave, which propagates in the opposite direction in the tool, i.e. towards the percussion device.

Depending on the situation, the reflected wave may comprise only a compression stress wave or a tensile stress wave. However, the reflected wave typically comprises both the tension stress wave component and the compression stress wave component. The stress wave travelling in the tool may be measured and the measuring result may be employed in controlling of the rock breaking device as described in U.S. Pat. No. 4,671,366, for example.

SUMMARY

An object of the present invention is to provide a novel rock breaking device and a method of monitoring the condition of the tool of the rock breaking device.

The invention is based on monitoring a condition of a tool of a rock breaking device by measuring stress waves propagating in the tool. In the invention it is generated into a tool a stress wave which propagates in the tool. The stress wave propagating in the tool is measured and at least on reflected stress wave component of the stress wave in respect of parts forming the tool is identified by determining a time of propagation of the reflected stress wave component, the at least one reflected stress wave component emerging in response to a discontinuity in the tool, an end of the tool or a point of a change of a cross-sectional area in the tool. In addition to the time of propagation, it is determined at least one additional property of the respective at least one reflected stress wave component, and the condition of the tool is determined on the basis of the time of propagation of the at least one reflected stress wave component and the at least one additional property of the same at least one reflected stress wave component.

An advantage of such is that it is possible to monitor a condition of a tool of a rock breaking device in respect of parts forming the tool.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

In the following the invention will be described in greater detail by means of preferred embodiments with reference to the accompanying drawings, in which.

For the sake of clarity, the figures show some embodiments of the disclosed solution in a simplified manner. In the figures, like reference numerals identify like elements.

DETAILED DESCRIPTION OF THE INVENTION

Rock breaking may be performed by drilling holes in a rock by a rock drilling machine. Alternatively, rock may be broken by a breaking hammer. In this context, the term "rock" is to be understood broadly to cover also a boulder, rock material, crust and other relatively hard material. The rock drilling machine and breaking hammer comprise an impact mechanism, which provides impact pulses to a tool either directly or through an adapter, such as a drill shank. The impact pulse generates a stress wave which propagates in the tool. When the stress wave reaches the end of the tool facing the rock to be drilled, the tool penetrates into the rock due to the influence of the wave. Some of the energy of the stress wave is reflected back as a reflected wave, which propagates in the opposite direction in the tool, i.e. towards the impact mechanism. Depending on the situation, the reflected stress wave may comprise only a compression stress wave or a tensile stress wave. However, the reflected stress wave typically comprises both tensile and compression stress wave components.

Figure 1:
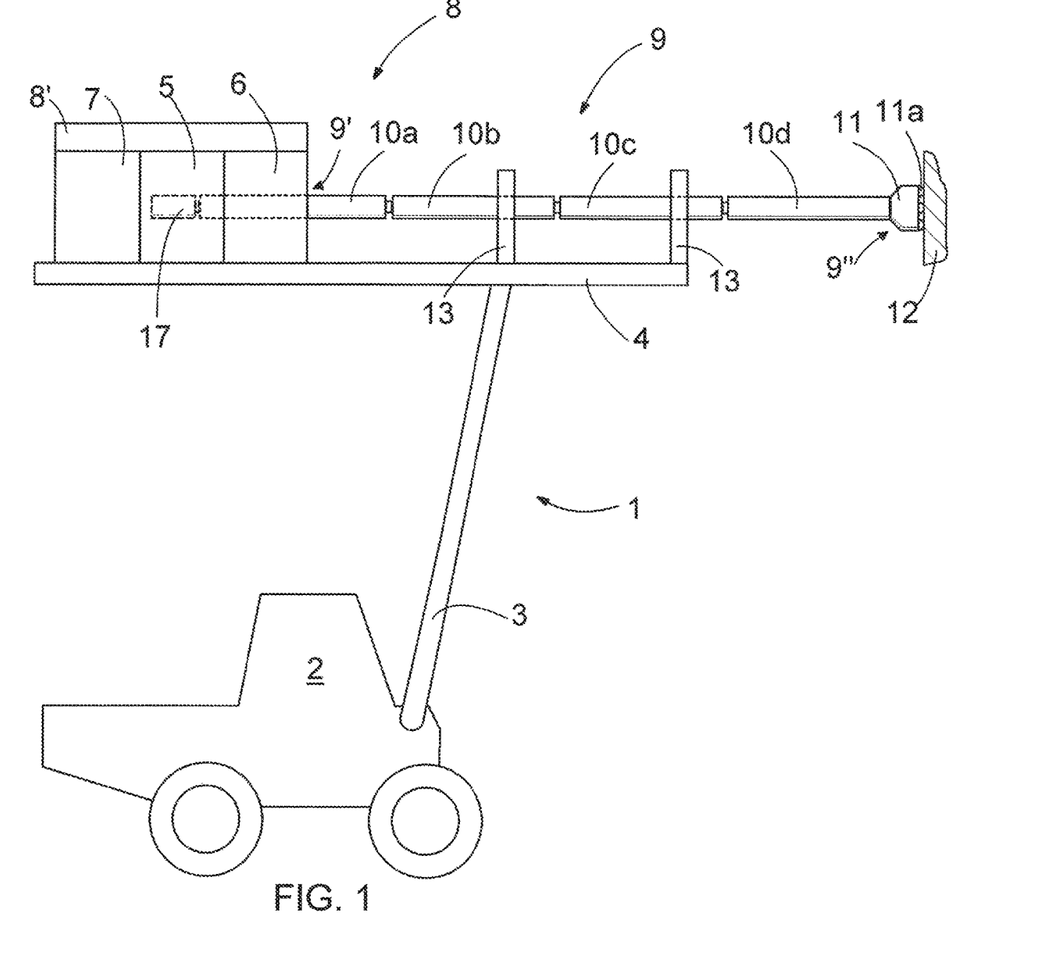
FIG. 1 is a schematic side view of a rock drilling rig and a rock drilling machine therein.

FIG. 1 shows schematically a significantly simplified side view of a rock drilling rig 1. The rock drilling rig 1 includes a movable carrier 2 and a boom 3 at the end of which there is a feed beam 4 provided with a rock drilling machine 8 having a frame 8', an impact mechanism 5 and a rotating mechanism 6. The rock drilling rig 1 of FIG. 1 also includes a tool 9, the proximal end 9' of which is coupled to the rock drilling machine 8 and the distal end 9" of which is oriented towards the rock 12 to be drilled. The proximal end 9' of the tool 9 is shown in FIG. 1 schematically by a broken line.

The tool 9 of the rock drilling rig 1 of FIG. 1 includes drill rods 10a, 10b, 10c, 10d or drill stems 10a, 10b, 10c, 10d or drill tubes 10a, 10b, 10c, 10d, a drill shank 17 at the proximal end 9' of the tool 9 and a drill bit 11 at the distal end 9" of the tool 9. The drill bit 11 may be provided with buttons 11a, although other drill bit structures are also possible. The interconnected drill rods, drill stems or drill tubes form a drill string. In the embodiment of FIG. 1, as well as in FIG. 3, the drill string, the drill shank 17 and the drill bit 11 form the tool 9 of the rock drilling machine 8, the drill rods, drill stems or drill tubes, the drill shank 17 and the drill bit 11 being parts of the tool 9. In drilling with sectional drill rods, also known as long hole drilling, a number of drill rods depending on the depth of the hole to be drilled are attached between the drill bit 11 and the rock drilling machine 8. For simplicity reasons later in this description the tool 9 is assumed to comprise the drill rods 10a-10d, the drill shank 17 and the drill bit 11, but depending on the actual implementation of the tool 9, the tool 9 may comprise the drill stems or the drill tubes instead of the drill rods.

In the embodiment of FIG. 1 it is also disclosed guide supports 13 attached to the feed beam 4 for supporting the tool 9. Furthermore, the rock drilling rig 1 of FIG. 1 also includes a feed mechanism 7, which is arranged to the feed beam 4, in relation to which the rock drilling machine 8 is movably arranged. During drilling the feed mechanism 7 is arranged to push the rock drilling machine 8 forward on the feed beam 4 and thus to push the drill bit 11 against the rock 12.

FIG. 1 shows the rock drilling rig 1 considerably smaller in relation to the structure of the rock drilling machine 8 than what it is in reality. For the sake of clarity, the rock drilling rig 1 of FIG. 1 has only one boom 3, feed beam 4, rock drilling machine 8 and feed mechanism 7 shown, although it is obvious that a rock drilling rig may be provided with a plurality of booms 3 having a feed beam 4, a rock drilling machine 8 and a feed mechanism 7. It is also obvious that the rock drilling machine 8 usually includes flushing means to prevent the drill bit 11 from being blocked. For the sake of clarity, no flushing means are shown in FIG. 1. The drilling machine 8 may be hydraulically operated, but it may also be pneumatically or electrically operated.

The drilling machine may also have a structure other than explained above. For example, in down-the-hole-drilling the impact mechanism is located in the drilling machine at the bottom of the drilling hole next to the drill bit, the drill bit being connected through the drill rods to the rotating mechanism located above the drilling hole.

The impact mechanism 5 may be provided with an impact piston reciprocating under the influence of pressure medium and striking to the tool either directly or through an intermediate piece, such as a drill shank or another kind of adapter between the tool 9 and the impact piston. Naturally an impact mechanism of a different structure is also possible. The operation of the impact mechanism 5 may thus also be based on use of electromagnetism or hydraulic pressure without any mechanically reciprocating impact piston and in this context the term impact mechanism refers also to impact mechanisms based on such characteristics.

The stress wave generated by the impact mechanism 5 is delivered along the drill shank 17 and the drill rods 10a to 10d towards the drill bit 11 at the distal end 9" of the tool 9. When the stress wave meets the drill bit 11, the drill bit 11 and its buttons 11a strike the rock 12 to be drilled, thereby causing to the rock 12 a strong stress due to which cracks are formed in the rock 12. Typically, part of the stress wave exerted on or acting on the rock 12 reflects back to the tool 9 and along the tool 9 back towards the impact mechanism 5. During drilling the rotating mechanism 6 transmits continuous rotating force to the tool 9, thus causing the buttons 11a of the drill bit 11 to change their position after an impact and strike to a new spot on the rock 12 at the next impact.

In breaking hammers, which provide another example of the rock breaking device, there is typically only an impact device, such as an impact piston, and a non-rotating tool, such as a chisel, and the impact provided by the impact device affects straight to the tool.

Figure 2:
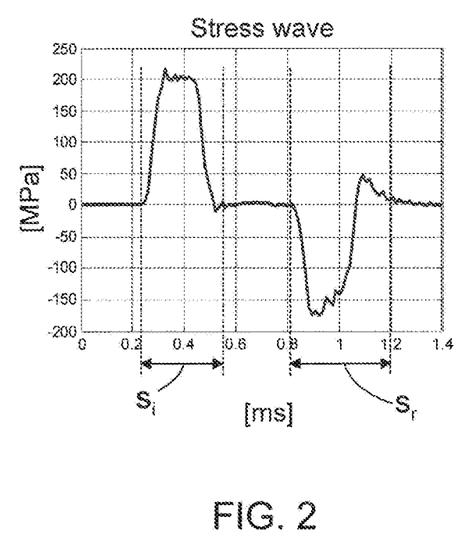
FIG. 2 shows schematically a stress wave appearing in rock drilling.

FIG. 2 shows schematically a stress wave, wherein the stress wave propagating towards the rock 12 to be drilled is denoted with a reference mark $s_i$ and the stress wave reflected from the rock 12 back to the tool 9 is denoted with a reference mark $s_r$.

Figure 3:
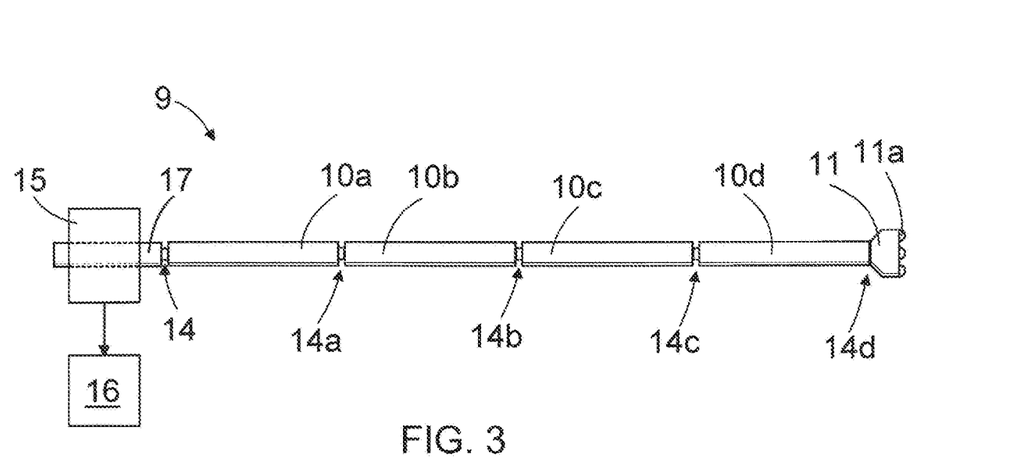
FIG. 3 is a schematic side view of a tool of the rock drilling machine shown in FIG. 1.

FIG. 3 shows schematically a side view of the tool 9 of the rock drilling machine 8 shown in FIG. 1. The tool 9 includes the drill shank 17, drill rods 10a-10d and the drill bit 11 connected to each other at joining points 14, 14a, 14b, 14c, 14d. The drill shank 17, the drill rods 10a-10d and the drill bit 11 are typically connected to each other with threaded couplings but other joining solutions could also be used.

As stated above, some of the energy of the stress wave generated into the tool and travelling towards the rock to be broken is reflected back as a reflected stress wave. The reflected stress wave is composed of components, i.e. reflected stress wave components, each reflected stress wave component being emerged or generated at a particular point in the tool. The typical points in the tool, wherein the reflected stress wave components are generated, are discontinuities in the tool, such as the joining points 14, 14a, 14b, 14c, 14d in the tool 9 of FIG. 3, an end of the tool, such as an end surface of the drill bit 11 comprising the buttons 11a, as well as any point of a tool comprising a change of a cross-sectional area of the tool. Any fractures possibly appearing in the tool, especially at the joining points of the parts of the tool, provide also a respective reflected stress wave component. By dividing the measured reflected stress wave into the reflected stress wave components, as disclosed next, a condition of the tool of the rock breaking device may be monitored and possible control actions controlling the operation of the rock breaking device may be carried out on the basis of that monitoring.

The reflected stress wave components of the stress wave in respect of the parts forming the tool 9 are identified by determining times of propagation of the reflected stress wave components, each reflected stress wave component emerging in response to a discontinuity in the tool, an end of the tool or a point of a change of a cross-sectional area in the tool, as said above. The determined time of the propagation of a specific reflected stress wave component associates or relates that specific reflected stress wave component to a specific point in the tool where the specific reflected stress wave component emerges in response to the properties of the tool at that point of the tool.

In addition to the times of propagation of the reflected stress wave components, at least one additional property of the respective reflected stress wave components is determined. The at least one additional property of the reflected stress wave component may be at least one of an energy of the reflected stress wave component, an attenuation of the reflected stress wave component, an amplitude of the reflected stress wave component, a shape of the reflected stress wave component and any interrelation thereof. The shape of the stress wave component may be determined for example by measuring a frequency content of the reflected stress wave component. A condition of the tool at the points where the reflected stress wave components emerge, or possible changes in the condition of the tool at the points where the reflected stress wave components emerge, may thereafter be determined or detected on the basis of the times of propagation of the reflected stress wave components and at least one additional property of the respective reflected stress wave components.

Figure 4:
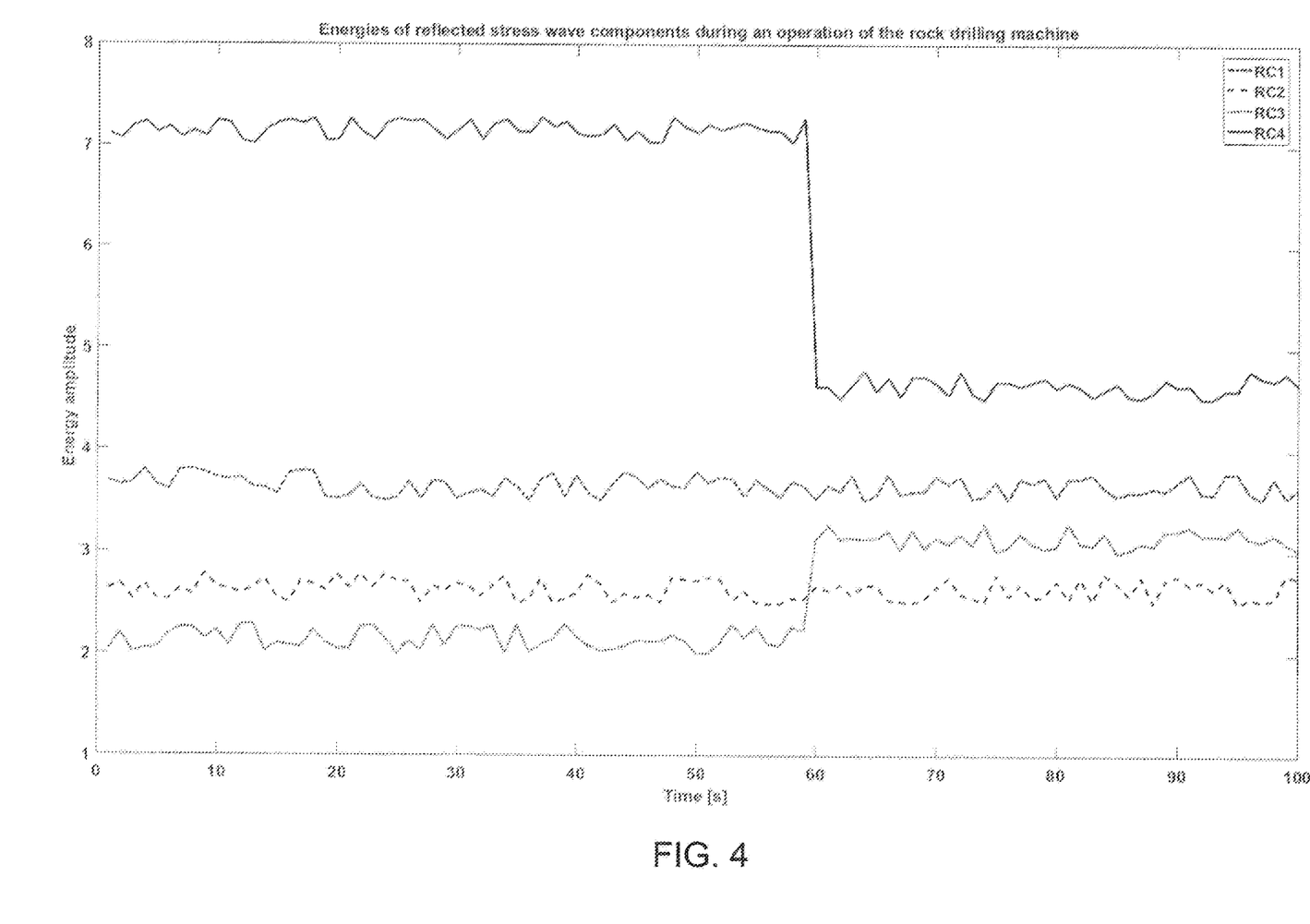
FIG. 4 shows schematically graphs indicating energy amplitudes of reflected stress wave components during an operation of the rock drilling machine.

An example of FIG. 4 discloses schematically graphs indicating energies of four reflected stress wave components RC1, RC2, RC3, RC4 emerged in a tool 9 like that of FIG. 3, i.e. in a tool composed of the drill shank 17, four successive drill rods 10a-10d and a drill bit 11 at the distal end of the tool 9, in response to stress waves generated in the tool 9. The y-axis of FIG. 4 presents energy amplitudes of the reflected stress wave components RC1-RC4 and the x-axis presents time in seconds.

In the example of FIG. 4 in view of the tool 9 of FIG. 3, the first reflected stress wave component RC1 indicates the reflected stress wave component emerged in response to the joining point 14a between the first drill rod 10a and the second drill rod 10b. The second reflected stress wave component RC2 indicates the reflected stress wave component emerged in response to the joining point 14b between the second drill rod 10b and the third drill rod 10c. The third reflected stress wave component RC3 indicates the reflected stress wave component emerged in response to the joining point 14c between the third drill rod 10c and the fourth drill rod 10d. The fourth reflected stress wave component RC4 indicates the reflected stress wave component emerged in response to the contact of the drill bit 11 against the rock 12. Any reflected stress wave component emerged in response to the drill shank 17 or in response to the joining point 14 between the drill shank 17 and the first drill rod 10a is ignored in FIG. 4, and also later in FIGS. 5 and 6.

In addition to the reflected stress wave components disclosed above there may exist also other measurable reflected stress wave components, such as reflected stress wave components originating for example from possible points of the tool comprising changes of the cross-sectional area of the tool. For the sake of clarity they are also neglected in this example because the energy levels of these reflected stress wave components are typically substantially small relative to the reflected stress wave components specifically mentioned above. Furthermore, the joining point 14d between the fourth drill rod 10d and the drill bit 11 may also generate a respective reflected stress wave component. In this example it is supposed, however, that the reflected stress wave component emerging in response to the fourth joining point 14d is included in the fourth reflected stress wave component RC4, which may take place in view of the stress wave measurement due to a very small distance between the end of the drill bit 11 facing to rock 12 and the fourth joining point 14d, unless very high sampling frequency is available for the measurement of the stress waves so that these two reflected stress wave components could also be distinguished from each other on the basis of the respective times of propagation. In other words, and referring to the example of FIG. 4, in this case the energy of the fourth reflected stress wave component RC4 indicates the combined energy of the energies of the reflected stress wave components emerging in response to the contact of the drill bit 11 against the rock 12 and in response to the fourth joining point 14d between the fourth drill rod 10d and the drill bit 11.

The reflected stress wave components may be measured by a measuring means 15 arranged in connection to the tool 9 or at an immediate vicinity of the tool 9. The operation of the measuring means 15 may for example be based on measuring changes in the magnetization of the tool 9 in response to the stress waves travelling in the tool 9. A variety of different suitable measuring means is known for a person skilled in the art of the rock breaking and a more detail configuration or an operation of these measuring means is not considered herein.

The measured reflected stress wave components RC1-RC4, i.e. measuring signals containing measurement information describing the measured reflected stress wave components RC1-RC4, are forwarded from the measuring means 15 to at least one computing unit 16 configured to analyse the measured reflected stress wave components for monitoring the condition of the tool of the rock breaking device. For this purpose the computing unit 16 is configured to identify reflected stress wave components of the stress wave in respect of the parts forming the tool by determining times of propagation of the reflected stress wave components, wherein, as said before, each reflected stress wave component emerges in response to the discontinuity in the tool, the end of the tool or the point of the change of the cross-sectional area in the tool. Furthermore, in addition to the times of propagation, the computing unit 16 is configured to determine at least one additional property of the respective reflected stress wave components and determine the condition of the tool on the basis of the time of propagation of the at least one reflected stress wave component and at least one additional property of the same at least one reflected stress wave component. The at least one computing unit 16 may form a part of a control unit configured to control operations of the rock drilling device, such as the rock drilling machine 8, and/or the operations of the whole rock drilling rig 1. The at least one computing unit 16 may also be a unit separate from said control unit.

In the schematic example of FIG. 4, the time period up to about 60 seconds relates to the normal operation of the rock drilling machine 8, the normal operation of the rock drilling machine 8 referring in this case to an operating situation of the rock drilling machine 8 wherein the tool 9 of the rock drilling machine 8 is undamaged. During this normal operation of the rock drilling machine 8 the energy amplitude of the fourth reflected stress wave component RC4 is typically the highest because it contains the energy of the stress wave component reflected from the rock 12 to be drilled back to the tool 9.

Figure 5:
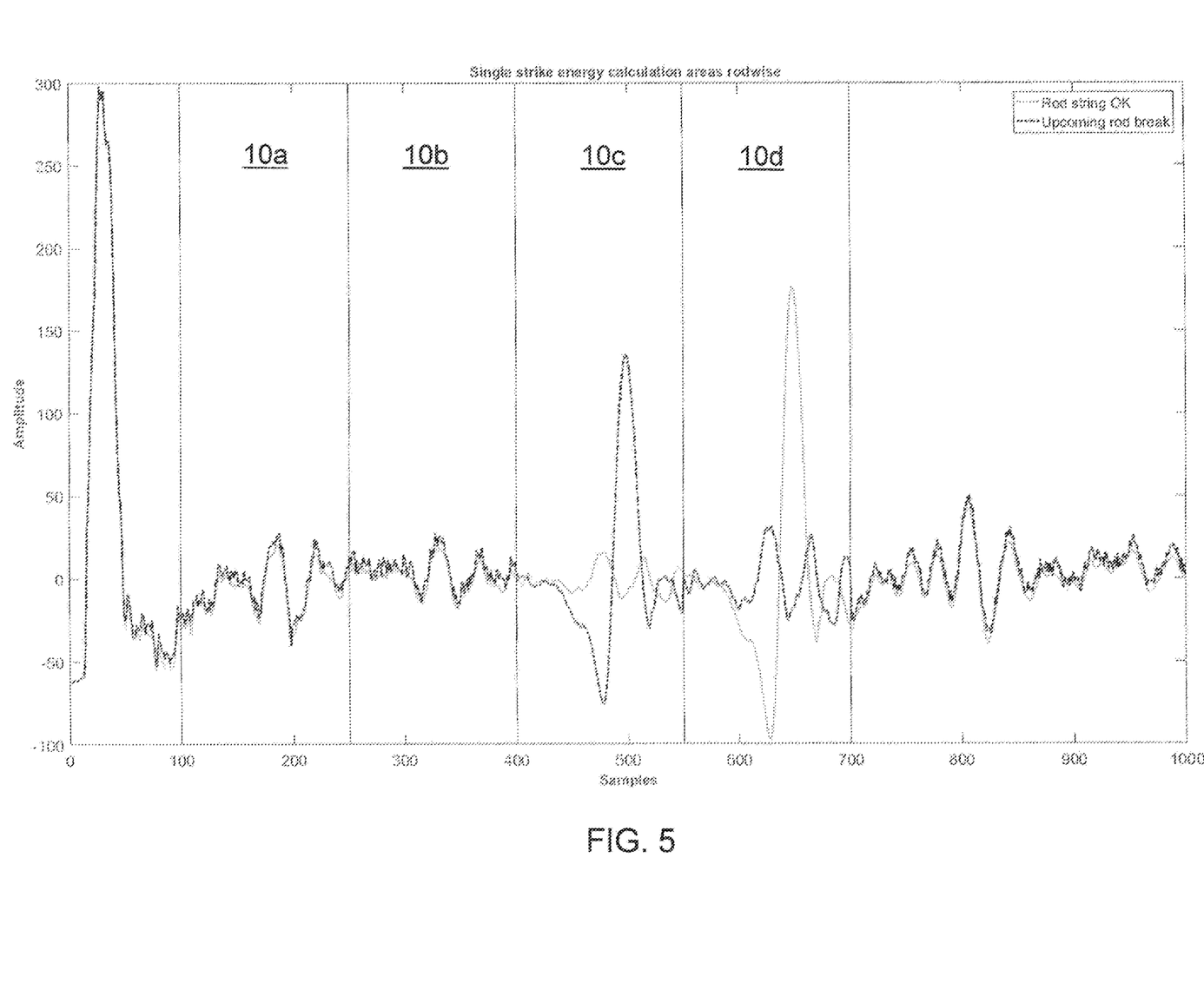
FIG. 5 shows schematically graphs indicating amplitudes of reflected stress wave components of FIG. 4 during an operation of the rock drilling machine with both an undamaged tool and an upcoming damage in the tool.
Figure 6:
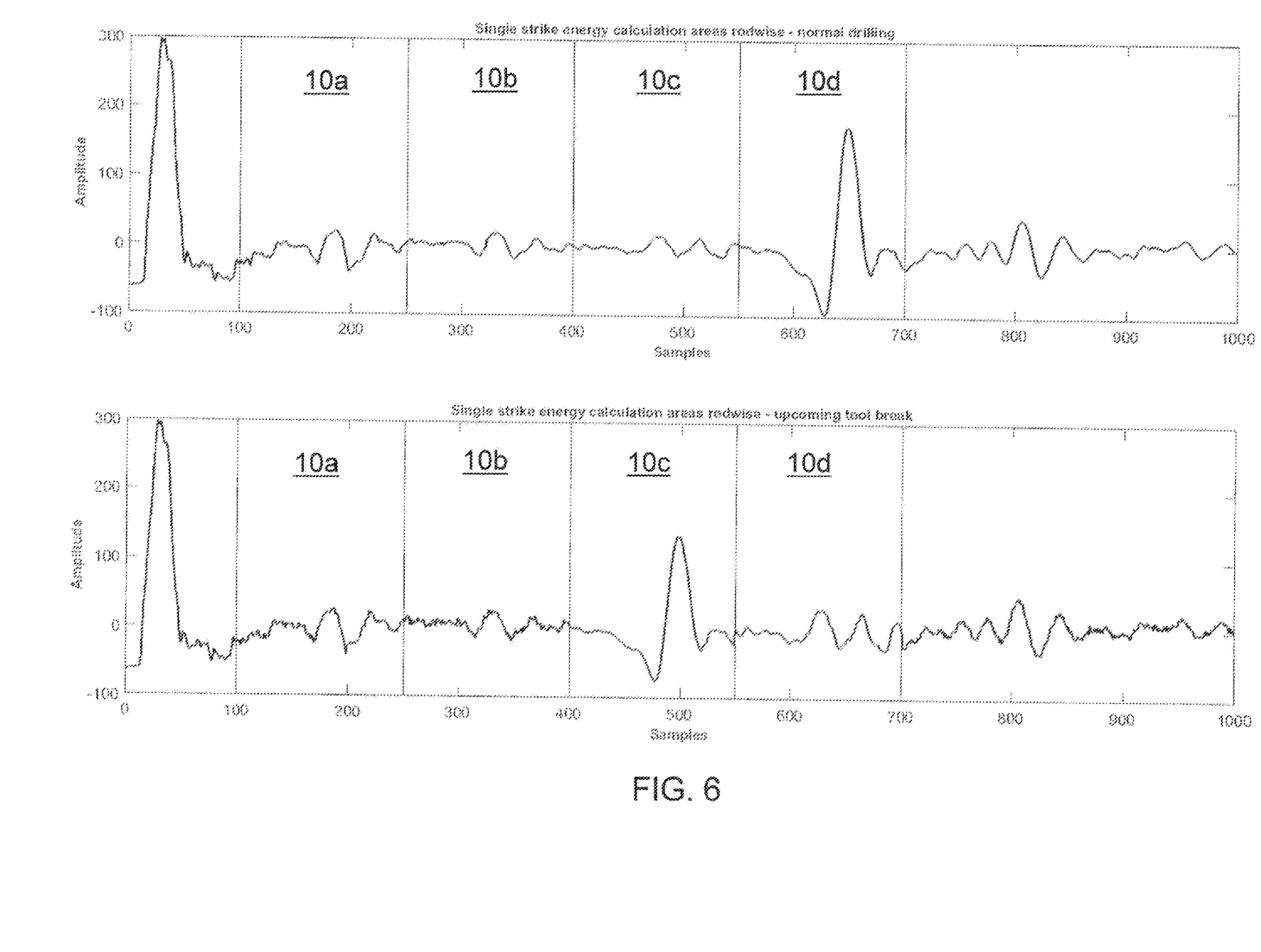
FIG. 6 shows schematically the graphs of FIG. 5 separately.

FIG. 5 shows schematically a graph as titled "Rod string OK" indicating amplitudes of the reflected stress wave components RC1-RC4 in response to a single impact to the tool 9 during the normal operation situation of the rock drilling machine 8 with the undamaged tool, i.e. relating to the operation situation corresponding to the time period up to about 60 seconds in FIG. 4. The same graph is presented also in the upper part of FIG. 6. In FIGS. 5 and 6 it is presented rodwise, i.e. for each rod 10a-10d, calculation areas for the reflected stress wave components RC1-RC4. The y-axis of FIGS. 5, 6 presents an amplitude of the measurement and the x-axis presents a number of samples. Similar to FIG. 4, FIGS. 5 and 6 show that the amplitude of the fourth reflected stress wave component RC4 is the highest because it contains the energy of the stress wave component reflected from the rock 12 to be drilled back to the tool 9.

Referring back to FIG. 4, at the time instant about 60 seconds a male thread breakage takes place in the third joining point 14c between the third drill rod 10c and the fourth drill rod 10d. This has the effects visible in FIG. 4, i.e.

the energy amplitude of the fourth reflected stress wave component RC4 decreases and the energy amplitude of the third reflected stress wave component RC3 increases when compared to the time period before said thread breakage. This takes place because said thread breakage prevents the stress wave generated in the tool 9 to pass over the third joining point 14c in the same extent than before the thread breakage and it looks more like the tool would comprise only three drill rods.

The effects of said thread breakage to the reflected stress wave components RC1-RC4 are also visible in FIG. 5, which shows schematically a graph as titled "Upcoming rod break" indicating amplitudes of the reflected stress wave components RC1-RC4 in response to the single impact to the tool 9 relating to the operation situation of the rock drilling machine 8 with the damaged tool, i.e. relating to the same operation situation as it is presented in FIG. 4 after the time instant about 60 seconds. The same graph is presented also in the lower part of FIG. 6. Similarly to FIG. 4, FIGS. 5 and 6 show that the amplitude of the fourth reflected stress wave component RC4 decreases and the amplitude of the third reflected stress wave component RC3 increases when compared to the time period before said thread breakage because the thread breakage prevents the stress wave generated in the tool 9 to pass over the third joining point 14c in the same extent than before the thread breakage.

As exemplified by the example of FIGS. 4 to 6, the breakage of the male thread between two successive tool parts of the rock breaking device may be detected by the disclosed solution by monitoring the reflected stress wave components emerged in the tool. In a similar way also other conditions of the tool, such as a breakage of a single part of the tool, such as a breakage of any drill rod 10a-10d in the rock drilling machine 8 or a chisel in a breaking hammer, or a loose joint between successive tool parts, may be detected well before a total breakage of the tool, which could lead for example to a loss of at least a part of the tool 9 into a hole to be drilled. The solution disclosed thus enables monitoring a number of different conditions of the tools by monitoring a number of reflected stress wave components and possible variations of properties thereof in respect of the parts forming the tool.

Referring again to FIG. 4, the measurement of the reflected stress wave components has been interrupted at time instant about 100 seconds. At this time instant there has been a total breakage of the male thread at the third joining point 14c between the third drill rod 10c and the fourth drill rod 10d. This indicates that the solution disclosed herein is able to detect the breakage in the tool well before the total breakage of the tool, whereby it is possible to control the operation of the rock breaking device, such as to stop the operation of the rock breaking device, well before the total breakage of the tool.

According to an embodiment an upcoming tool break may be detected in response to an appearance of at least one new reflected stress wave component in the measured stress wave, i.e. at least one new reflected stress wave component having a time of propagation not appeared at a beginning of the measurement of the stress wave and having at least one additional property that is significant relative to the at least one additional property of the at least one reflected stress wave component being present at the beginning of the measurement of the stress wave.

According to an embodiment an upcoming tool break may be detected in response to a change in a level of the at least one additional property of the at least one reflected stress wave component when compared to a level of the at least one additional property at the beginning of the measurement of the stress wave. The level of the at least one additional property at the beginning of the measurement of the stress wave thus provides a reference level to which the level of the at least one additional property is compared during the measurement of the stress wave for detecting a possible upcoming tool break. FIG. 4 provides an example of this kind of embodiment.

According to an embodiment an upcoming tool break may be detected in response to a change in a level of a ratio of at least one additional property of at least two reflected stress wave components when compared to a level of a ration of the at least one additional property of the at least two reflected stress wave components at the beginning of the measurement of the stress wave. The level of the ratio of the at least one additional property of the at least two reflected stress wave components at the beginning of the measurement of the stress wave thus provides a reference level to which the level of the ratio of the at least one additional property of the at least two reflected stress wave components is compared during the measurement of the stress wave for detecting a possible upcoming tool break.

According to an embodiment, the computing unit is configured to monitor a variation of the at least one additional property of the reflected stress wave component time-wise and control the operation of the rock breaking device in response to a number of unexpected changes appearing in the at least one additional property of the reflected stress wave component. The changes appearing in the at least one additional property of the reflected stress wave component is monitored and if there is any unexpected change in the property to be monitored, typically abrupt change but possibly also a long-term change, the computing unit may effect on the operation of the rock breaking device, either directly or through the aforementioned control unit dedicated for the rock breaking device, for controlling the operation of the rock breaking device, such as to stop the operation of the rock breaking device. The unexpected change refers to a change which is not expected to happen during a normal operation of the rock breaking device, for example due to a normal wear of the tool. The abrupt changes, like that disclosed in FIG. 4, but possibly also the long-term changes, may for example also be detected by comparing values describing the at least one additional property of the reflected stress wave component to a limit value set for that additional property. The limit value may for example be determined on the basis of the values of that additional property during a beginning of the normal operation situation of the rock breaking device.

According to an embodiment, the computing unit is configured to compute substantially continuously values of the at least one additional property of the reflected stress wave component, compare at least one latest value of the additional property to at least one previous value of the same additional property, and determine the condition of the tool on the basis of said comparison. In this embodiment the at least one latest determined value of the additional property is compared to at least one previous value of the same additional property, and if there is a significant difference, for example in per cents more than five, ten or twenty per cents, between the at least one latest value and the at least one previous value, it may be assumed that there is a breakage in the tool.

According to an embodiment, the computing unit is configured to compute substantially continuously values of the at least one additional property of the reflected stress wave component, compare a first value determined on the basis of at least one latest value of the additional property to a second value determined on the basis of at least one previous value of the same additional property, and determine the condition of the tool on the basis of said comparison. This embodiment is substantially similar to the embodiment of previous paragraph, but in this embodiment it is inspected auxiliary values determined on the basis of the values describing the additional property and not the values describing the additional property as such.

According to an embodiment, the computing unit is configured to control at least one operating parameter of the rock breaking device in response to a number of unexpected changes in the at least one additional property of the reflected stress wave component. This means for example that in some cases only one single significant change in the value of the at least one additional property may cause the computing unit to control the operation of the rock breaking device, but in some cases it may take few or several minor changes in the value of the at least one additional property before any control action by the computing unit is provided.

According to an embodiment, the computing unit is configured to control the rock breaking device to stop the operation in response to a number of unexpected changes in the at least one additional property of the reflected stress wave component.

In addition to the rock drilling machines, the monitoring of the condition of the tool disclosed herein may be applied in other rock breaking devices employing impact pulses, such as breaking hammers or other breaking devices intended for breaking rock material or another hard material.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A method of monitoring a condition of a tool of a rock breaking device, the method comprising:
    generating a stress wave which propagates in the tool;
    measuring the stress wave propagating in the tool;
    identifying at least one reflected stress wave component of the stress wave in a respective part of a plurality of parts forming the tool, by determining a time of propagation of the at least one reflected stress wave component, the at least one reflected stress wave component emerging in response to a discontinuity in the tool, an end of the tool or a point of a change of a cross-sectional area in the tool;
    determining, in addition to the time of propagation, at least one additional property of a respective at least one reflected stress wave component, wherein the at least one additional property is at least one of an energy of the reflected stress wave component, an attenuation of the reflected stress wave component, an amplitude of the reflected stress wave component, a shape of the reflected stress wave component and any interrelation thereof;
    determining the condition of the tool on the basis of the time of propagation of the at least one reflected stress wave component and the at least one additional property of the same at least one reflected stress wave component;
    monitoring a variation of the at least one additional property of the reflected stress wave component timewise; and
    controlling an operation of the rock breaking device in response to a number of unexpected changes appearing in the at least one additional property of the reflected stress wave component.

2. The method as claimed in claim 1, further comprising computing substantially continuously values of the at least one additional property of the reflected stress wave component, comparing at least one latest value of the additional property to at least one previous value of the same additional property, and determining the condition of the tool on the basis of said comparison.

3. The method as claimed in claim 1 or 2, further comprising computing substantially continuously values of the at least one additional property of the reflected stress wave component, comparing a first value determined on the basis of at least one latest value of the additional property to a second value determined on the basis of at least one previous value of the same additional property, and determining the condition of the tool on the basis of said comparison.

4. The method as claimed in claim 1, further comprising controlling at least one operating parameter of the rock breaking device in response to a number of unexpected changes in the at least one additional property of the reflected stress wave component.

5. The method as claimed in claim 1, further comprising controlling the rock breaking device to stop the operation in response to a number of unexpected changes in the at least one additional property of the reflected stress wave component.

6. A rock breaking device comprising:
    a frame;
    a tool;
    a device for generating stress waves in the tool;
    measuring means for measuring the stress wave propagating in the tool; and
    at least one computing unit for monitoring a condition of the tool of the rock breaking device on the basis of a measured stress wave, the at least one computing unit being configured to identify at least one reflected stress wave component of the stress wave in a respective part of a plurality of parts forming the tool by determining a time of propagation of the at least one reflected stress wave component, the at least one reflected stress wave component emerging in response to a discontinuity in the tool, an end of the tool or a point of a change of a cross-sectional area in the tool, determine, in addition to the time of propagation, at least one additional property of the respective at least one reflected stress wave component, wherein the at least one additional property is at least one of an energy of the reflected stress wave component, an attenuation of the reflected stress wave component, an amplitude of the reflected stress wave component, a shape of the reflected stress wave component and any interrelation thereof, determine a condition of the tool on the basis of the time of propagation of the at least one reflected stress wave component and the at least one additional property of the same at least one reflected stress wave component, monitor a variation of the at least one additional property of the reflected stress wave component timewise, and control the operation of the rock breaking device in response to a number of unexpected changes appearing in the at least one additional property of the reflected stress wave component.

7. The rock breaking device as claimed in claim 6, wherein the computing unit is configured to compute substantially continuously values of the at least one additional property of the reflected stress wave component, compare at least one latest value of the additional property to at least one previous value of the same additional property, and determine the condition of the tool on the basis of said comparison.

8. The rock breaking device as claimed in claim 6, wherein the computing unit is configured to compute substantially continuously values of the at least one additional property of the reflected stress wave component, compare a first value determined on the basis of at least one latest value of the additional property to a second value determined on the basis of at least one previous value of the same additional property, and determine the condition of the tool on the basis of said comparison.

9. The rock breaking device as claimed in claim 6, wherein the computing unit is configured to control at least one operating parameter of the rock breaking device in response to a number of unexpected changes in the at least one additional property of the reflected stress wave component.

10. The rock breaking device as claimed in claim 6, wherein the computing unit is configured to control the rock breaking device to stop the operation in response to a number of unexpected changes in the at least one additional property of the reflected stress wave component.

* * * * *